(12) United States Patent
Tsuei et al.

(10) Patent No.: US 9,690,139 B2
(45) Date of Patent: Jun. 27, 2017

(54) DISPLAY PANEL

(71) Applicant: InnoLux Corporation, Jhu-Nan, Miao-Li County (TW)

(72) Inventors: Bo-Chin Tsuei, Jhu-Nan (TW); Jian-Cheng Chen, Jhu-Nan (TW)

(73) Assignee: INNOLUX CORPORATION, Jhu-Nan, Miao-Li County (TW)

( * ) Notice: Subject to any disclaimer, the term of this patent is extended or adjusted under 35 U.S.C. 154(b) by 0 days.

(21) Appl. No.: 15/048,116

(22) Filed: Feb. 19, 2016

(65) Prior Publication Data
US 2016/0259213 A1   Sep. 8, 2016

(30) Foreign Application Priority Data
Mar. 3, 2015   (CN) .......................... 2015 1 0093631

(51) Int. Cl.
*G02F 1/1337*   (2006.01)
*G02F 1/1343*   (2006.01)

(52) U.S. Cl.
CPC .. *G02F 1/133753* (2013.01); *G02F 1/134309* (2013.01); *G02F 2001/133757* (2013.01); *G02F 2001/134345* (2013.01)

(58) Field of Classification Search
None
See application file for complete search history.

(56) References Cited

U.S. PATENT DOCUMENTS

| | | | |
|---|---|---|---|
| 2010/0002162 A1* | 1/2010 | Morimoto | G02F 1/134363 349/38 |
| 2010/0026948 A1* | 2/2010 | Wang | G02F 1/1337 349/129 |
| 2010/0157229 A1* | 6/2010 | Sakurai | G02F 1/134363 349/141 |
| 2010/0259712 A1* | 10/2010 | Jeong | G02F 1/134309 349/128 |
| 2012/0038855 A1* | 2/2012 | Tasaka | G02F 1/134309 349/96 |
| 2012/0194753 A1* | 8/2012 | Shin | G02F 1/133788 349/33 |
| 2013/0258256 A1* | 10/2013 | Kim | G02F 1/13363 349/102 |
| 2015/0029449 A1* | 1/2015 | Woo | G02F 1/133512 349/110 |

(Continued)

*Primary Examiner* — Ryan Crockett
(74) *Attorney, Agent, or Firm* — Muncy, Geissler, Olds & Lowe, P.C.

(57) ABSTRACT

A display panel comprises a first electrode on the first substrate and a first alignment layer on the first electrode. The first alignment layer is disposed on the first electrode and comprises a first alignment area and a second alignment area. An alignment direction of the first alignment area is opposite to an alignment direction of the second alignment area. The first electrode is disposed in the first alignment area and comprises a first trunk electrode and at least two first branch electrodes respectively connected to two sides of the first trunk electrode. At least one of the first branch electrodes comprises a first distal end and a first connection end connected to the first trunk electrode. An included angle between the extending direction from the first distal end to the first connection end and the alignment direction of the first alignment area is between 50° and 80°.

10 Claims, 11 Drawing Sheets

(56) References Cited

U.S. PATENT DOCUMENTS

| | | | | |
|---|---|---|---|---|
| 2015/0036073 A1* | 2/2015 | Im | G02F 1/1333 | 349/48 |
| 2015/0055063 A1* | 2/2015 | Hsieh | G02F 1/133753 | 349/99 |
| 2015/0055072 A1* | 2/2015 | Tsuei | G02F 1/133753 | 349/128 |
| 2015/0277189 A1* | 10/2015 | Kim | G02F 1/133707 | 349/123 |
| 2016/0033826 A1* | 2/2016 | Guo | G02F 1/133784 | 257/72 |
| 2016/0246135 A1* | 8/2016 | Tae | G02F 1/133753 | |

* cited by examiner

DISPLAY PANEL

CROSS REFERENCE TO RELATED APPLICATIONS

This Non-provisional application claims priority under 35 U.S.C. §119(a) on Patent Application No(s). 201510093631.7 filed in People's Republic of China on Mar. 3, 2015, the entire contents of which are hereby incorporated by reference.

BACKGROUND OF THE INVENTION

Field of Invention

This invention relates to a display panel and, in particular, to a display panel with a better display quality.

Related Art

With the progress of technologies, flat display devices have been widely applied to various kinds of fields. Because liquid crystal display (LCD) devices have advantages such as compact structure, low power consumption, less weight and less radiation, they gradually take the place of cathode ray tube (CRT) display devices, and are applied to various electronic products, such as mobile phones, portable multimedia devices, notebooks, LCD TVs and LCD screens.

A conventional LCD device mainly includes an LCD panel and a backlight module which are disposed opposite to each other. The LCD panel mainly includes a color filter (CF) substrate, a thin film transistor (TFT) substrate and a liquid crystal layer disposed between the two substrates. The CF substrate, the TFT substrate and the LC layer can form a plurality of pixel disposed in an array. The backlight module emits the light passing through the LCD panel, and the pixels of the LCD panel can display colors to form images accordingly.

Regarding the wide viewing angle technology for the VA LCD (Vertical Alignment LCD) panel, the manufacturer of the display device has utilized the photo-alignment technology to control the alignment direction of the LC molecules, so as to enhance the optical performance and the yield of the LCD panel. The photo-alignment technology form the multi-domain alignment in each pixels of the panel, so that the LC molecules in the pixel can be oriented towards, for example, four different directions. However, although the VA LCD panel made by the photo-alignment technology has better characteristics of high contrast ratio (CR) and short response time (RT), the side view effect thereof is worse than that of the FFS (fringe field switching) LCD panel or the IPS (in-plane switching) LCD panel.

Refer to FIG. 1A, which is a schematic diagram showing the gamma (γ) curves corresponding to the different gray levels displayed by a conventional VA LCD panel. Herein, the four-domain alignment is illustrated as an example. The curves C1, C2, C3 in FIG. 1A represent the gamma curves with respect to the front view, the side view of 45° and the side view of 60°, respectively. From FIG. 1A, it can be found that the side view will undergo a serious washout problem when the VA LCD panel is formed by the four-domain alignment, and that is, the image will become whiter because the it is too bright at the side view. Therefore, the display quality at the side view is inferior.

Moreover, refer to FIG. 1B, which is another schematic diagram showing the gamma curves corresponding to the different gray levels displayed by another conventional VA LCD panel. Herein, the pixel is divided into two areas (such as an area A and an area B) and the eight-domain alignment is illustrated as an example. The compensation which results from different voltage-transmittance curves for the areas A and B at the front view and side view helps the low color shift (LCS). The curves C4, C5(A), C6(B) in FIG. 1B are respectively the curve with respect to the front view, the gamma curve with respect to the area A and the gamma curve with respect to the area B, and the curve (C5+C6) is the sum of the gamma curves with respect to the area A and the area B. In comparison with FIG. 1A, although the washout problem occurring in the VA display panel can be improved by the LCS technology shown in FIG. 1B, its display quality at the side view still can't as fine as the FFS display panel or IPS display panel.

Therefore, a display panel which can have a better side view effect with a better display quality is needed.

SUMMARY OF THE INVENTION

An aspect of this disclosure is to provide a display panel having a better side view effect so that the display quality can be improved.

A display panel of an embodiment of this disclosure comprises a first substrate, a second substrate, a display medium layer, a first electrode and a first alignment layer. The display medium layer is disposed between the first substrate and the second substrate. The first electrode is disposed on the first substrate. The first alignment layer is disposed on the first electrode and comprises a first alignment area and a second alignment area. An alignment direction of the first alignment area is opposite to an alignment direction of the second alignment area. The first electrode is disposed in the first alignment area and comprises a first trunk electrode and at least two first branch electrodes respectively connected to two sides of the first trunk electrode. At least one of the first branch electrodes comprises a first distal end and a first connection end connected to the first trunk electrode, and an included angle between the extending direction from the first distal end to the first connection end and the alignment direction of the first alignment area is between 50° and 80°.

In one embodiment, the display panel further comprises a second electrode. The second electrode is disposed in the second alignment area and comprises a second trunk electrode and at least two second branch electrodes respectively connected to two sides of the second trunk electrode. At least one of the second branch electrodes comprises a second distal end and a second connection end connected to the second trunk electrode. An included angle between the extending direction from the second distal end to the second connection end and the alignment direction of the second alignment area is between 50° and 80°, and the first electrode is electrically connected with the second electrode.

In one embodiment, the first trunk electrode and the second trunk electrode are disposed parallelly, and one of the first branch electrodes is substantially parallel to one of the adjacent second branch electrodes.

In one embodiment, the display panel further comprises a second alignment layer disposed on the second substrate. The second alignment layer comprises a third alignment area corresponding to the first alignment area and a fourth alignment area corresponding to the second alignment area.

In one embodiment, the display medium layer comprises a plurality of liquid crystal molecules, and an included angle between a long-axis direction of the liquid crystal molecules and a normal vector of the first substrate is between 0.5° and 2°.

In one embodiment, an alignment direction of the third alignment area is opposite to an alignment direction of the fourth alignment area.

In one embodiment, the alignment direction of the third alignment area is the same as or opposite to the alignment direction of the first alignment area.

In one embodiment, the display panel further comprises a third electrode disposed on the first substrate. The first alignment layer covers the third electrode. The second electrode is disposed between the first electrode and the third electrode. The third electrode at least comprises a third trunk electrode and at least two third branch electrodes respectively connected to two sides of the third trunk electrode. At least one of the third branch electrodes comprises a third distal end and a third connection end connected with the third trunk electrode. An included angle between the extending direction from the third distal end to the third connection end and the alignment direction of the second alignment area is between 50° and 80°, and a voltage difference exists between the second electrode and the third electrode during a frame time.

In one embodiment, the display panel further comprises a third electrode disposed on the first substrate. The first alignment layer covers the third electrode. The second electrode is disposed between the first electrode and the third electrode. The third electrode at least comprises a third trunk electrode and at least two third branch electrodes respectively connected to two sides of the third trunk electrode. At least one of the third branch electrodes is parallel to the adjacent second branch electrode, and a voltage difference exists between the second electrode and the third electrode during a frame time.

In one embodiment, the alignment direction of the first alignment area is substantially parallel to the extending direction of a scan line or a data line of the display panel.

As mentioned above, in the display panel of the disclosure, an alignment direction of the first alignment area of the first alignment layer is opposite to an alignment direction of the second alignment area. The first electrode is disposed in the first alignment area and includes a first trunk electrode and at least two first branch electrodes respectively connected to two sides of the first trunk electrode. At least one of the first branch electrodes includes a first distal end and a first connection end connected to the first trunk electrode, and an included angle between the extending direction from the first distal end to the first connection end and the alignment direction of the first alignment area is between 50° and 80°. By the design of the pixel electrode and the alignment direction of one of the embodiments of the disclosure, the washout problem at the side view occurring in the conventional LCD panel can be improved, and the side view characteristics of the display panel becomes better even as possibly fine as the FFS or IPS display panel for better display quality.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE INVENTION

The present invention will be apparent from the following detailed description, which proceeds with reference to the accompanying drawings, wherein the same references relate to the same elements.

Figure 1A:
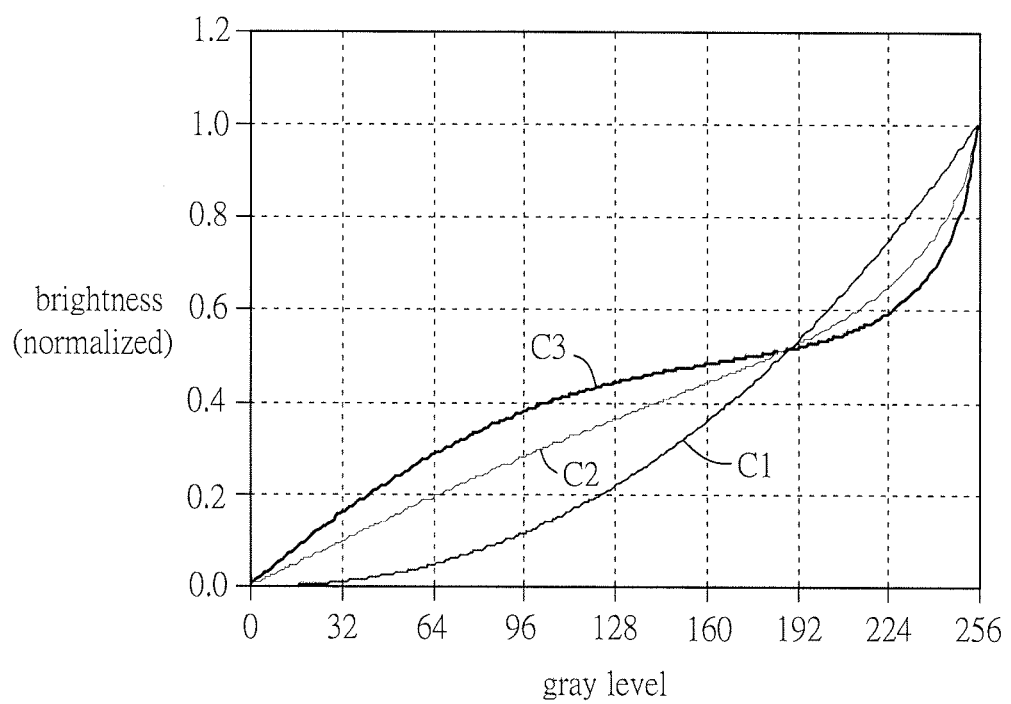
FIGS. 1A and 1B are schematic diagrams showing the gamma curves corresponding to the different gray levels displayed by a conventional VA LCD panel.
Figure 1B:
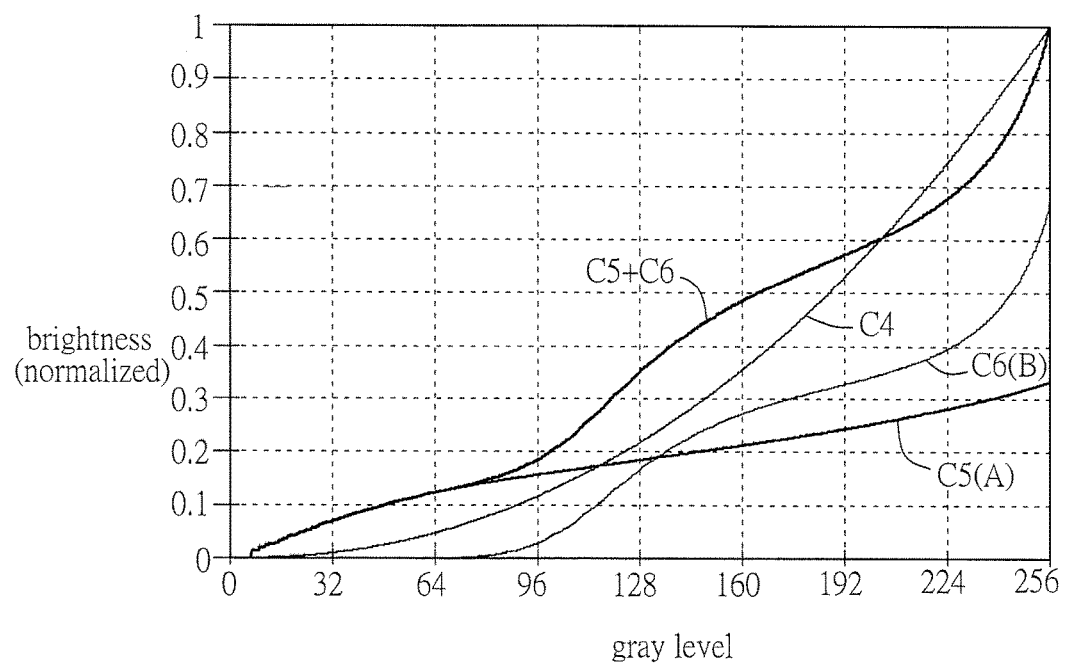
Figure 2A:
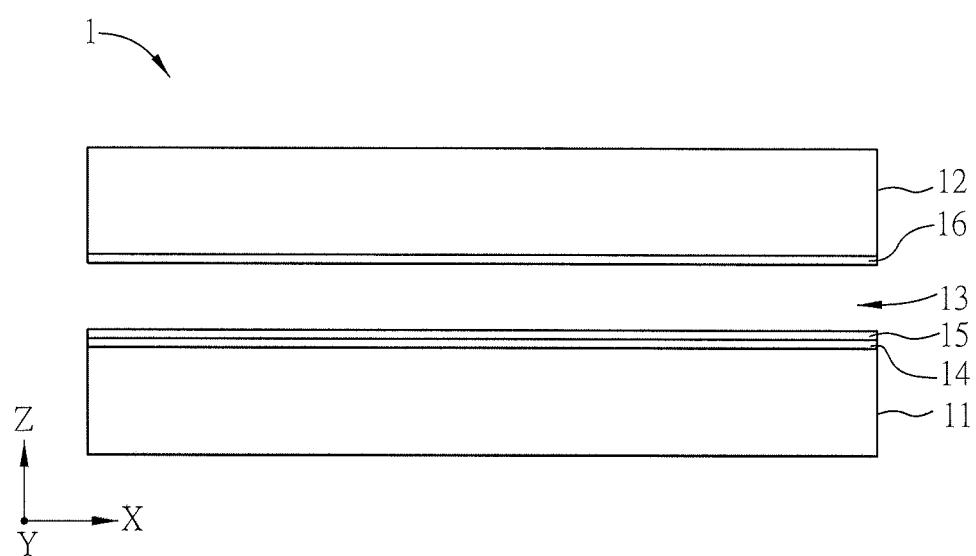
FIG. 2A is a schematic diagram of a display panel of an embodiment of the disclosure.
Figure 2B:
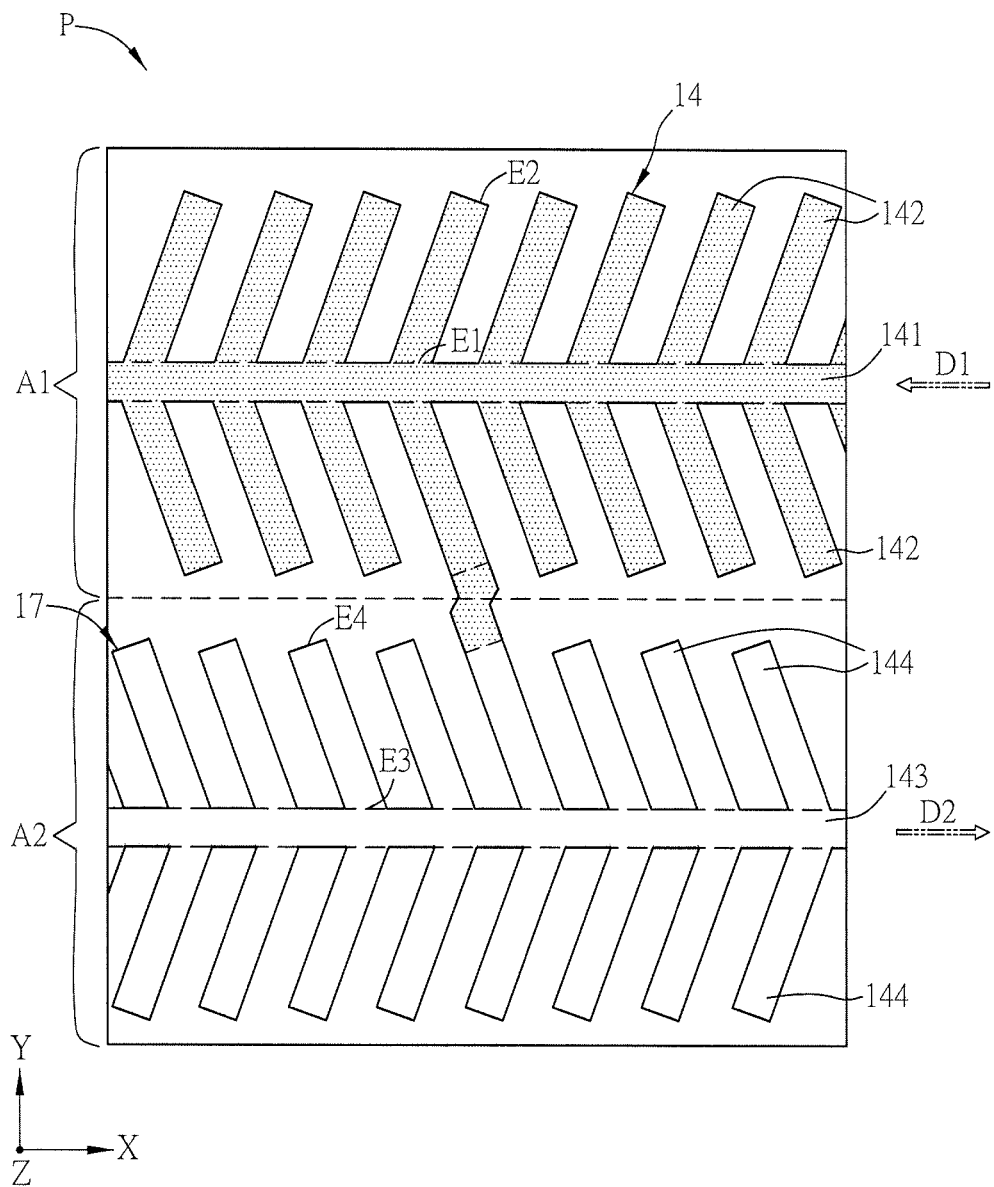
FIG. 2B is a schematic diagram showing the first electrode of a pixel of the display panel in FIG. 2A with the alignment direction of the first electrode.

Refer to FIGS. 2A and 2B, wherein FIG. 2A is a schematic diagram of a display panel 1 of an embodiment of the disclosure and FIG. 2B is a schematic diagram showing the first electrode 14 of a pixel P of the display panel 1 in FIG. 2A with the alignment direction of the first electrode.

The display panel 1 of this embodiment is the VA LCD panel. The VA LCD panel has characteristics of high contrast ratio and short response time but the side view effect thereof is worse than the side view effect of IPS or FFS display panel. Therefore, in this embodiment by the photo-alignment technology and the layout design of the pixel electrode, the side view characteristics is improved as possibly fine as IPS or FFS for a better display quality. Moreover, for facilitating the illustration of this disclosure, a first direction X, a second direction Y and a third direction Z are shown in the figures, and any two of them are perpendicular to each other. The first direction X is substantially parallel to the extending direction of the scan line of the display panel 1, the second direction Y is substantially parallel to the extending direction of the data line of the display panel 1, and the third direction Z is perpendicular to the first direction X and the second direction Y.

As shown in FIG. 2A, the display panel 1 includes a first substrate 11 and a second substrate 12, and the first substrate 11 and the second substrate 12 are disposed oppositely. The first substrate 11 or the second substrate 12 may be made of transparent material, such as glass, quartz or the like, plastic material, rubber, fiberglass or other polymer materials. The first substrate 11 or the second substrate 12 could be made of opaque material, for example, a metal-fiberglass composite plate, a metal-ceramic composite plate, a printed circuit board or others. In this embodiment, the first substrate 11 and the second substrate 12 are both made of transparent glass material for example. Moreover, the display panel 1 further includes a thin film transistor (TFT) array and a color filter (CF) array (not shown). The TFT array is disposed on the side of the first substrate 11 facing the second substrate 12, and the CF array can be disposed on the side of the second substrate 12 facing the first substrate 11 or disposed on the side of the first substrate 11 facing the second substrate 12. Herein, the TFT array is disposed on the first substrate 11 (or called the TFT substrate), and the CF array is disposed on the second substrate 12 (or called the CF substrate). However, if a color filter layer (including red portions (R), green portions (G) and blue portions (B) for example) of the CF array is disposed on the first substrate 11, the first substrate 11 can be made a COA (color filter on array) substrate. Or, if a black matrix of the CF array is disposed on the first substrate 11, the first substrate 11 can be made a BOA (BM on array) substrate.

The display panel 1 further includes a display medium layer 13, a first electrode 14, a first alignment layer 15 and a second alignment layer 16. The display medium layer 13 is disposed between the first substrate 11 and the second substrate 12 and disposed between the TFT array and the CF array. Herein, the display medium layer 13 is disposed between the first alignment layer 15 and the second alignment layer 16. The TFT array, the CF array and the display medium layer 13 can form a pixel array including at least one pixel (or called a sub-pixel) P. Herein for example, a plurality of pixels P are arranged into a matrix (not shown) formed by columns and rows. Each of the pixels can be divided into multiple domains, and these multiple domains of the pixel can be arranged into a matrix formed by columns and rows. Besides, the display panel 1 can further include a plurality of scan lines and a plurality of data lines (not shown), and the scan lines and the data lines are disposed across each other to define the area of the pixels.

As shown in FIGS. 2A and 2B, the first electrode 14 is disposed on the first substrate 11, and the first alignment layer 15 is disposed on the first electrode 14. Herein, the first alignment layer 15 covers the first electrode 14 and the second alignment layer 16 is disposed on the second substrate 12. The first electrode 14 is a transparent electrode layer, and the material thereof can be, for example, ITO (indium tin oxide), IZO (indium zinc oxide), AZO (Al-doped zinc oxide), cadmium tin oxide (CTO), $SnO_2$, ZnO or other transparent conducting materials. The material of the first alignment layer 15 and the second alignment layer 16 is, for example but not limited to, polyimide (PI). The first electrode 14 of this embodiment is illustrated as the pixel electrode of the pixel P for example. Besides, when scan signals are sequentially received by the scan lines of the display panel 1, it turns on the TFT (not shown) relating to each corresponding scan line. Then, the data signals for the corresponding pixels P can be transmitted to the corresponding pixel electrodes through the data lines. Thus, the display panel 1 can display images accordingly. In this embodiment, the gray-level voltage can be transmitted to the first electrode layer 14 (pixel electrode) of each pixel P through each data line, and an electric filed can be thus formed between the first electrode layer 14 and another electrode (not shown) disposed between the first electrode 14 and the second substrate 12 to drive the LC molecules of the display medium layer 13 to rotate. Therefore, the light can be modulated and the display panel 1 can display images accordingly.

The first alignment layer 15 includes a first alignment area A1 and a second alignment area A2, and the alignment direction D1 of the first alignment area A1 is opposite to the alignment direction D2 of the second alignment area A2. In this embodiment, the first alignment direction D1 of the first alignment area A1 and the alignment direction D2 of the second alignment area A2 are substantially parallel to the first direction X (the parallel direction refers to the same direction or opposite direction; the first direction X is substantially parallel to the extending direction of the scan line (not shown)), and the alignment direction D1 of the first alignment area A1 and the alignment direction D2 of the second alignment area A2 are opposite to each other. Herein, the direction D1 is the direction from right to left and the direction D2 is the direction from left to right.

By the photo-alignment technology and the disposition of the first alignment layer 15 and the second alignment layer 16, different orientation directions of the LC molecules are defined in the pixels P of the display panel 1. Under a designate exposure condition, the multi-domain orientation directions of the LC molecules are foil led by the combination of the alignment direction of the first alignment layer 15 of the first substrate 11 and the alignment direction of the second alignment layer 16 of the second substrate 12. The second alignment layer 16 includes a third alignment area A3 corresponding to the first alignment area A1 and a fourth alignment area A4 corresponding to the second alignment area A2. Besides, an alignment direction of the third alignment area A3 is opposite to an alignment direction of the fourth alignment area A4.

Figure 2C:
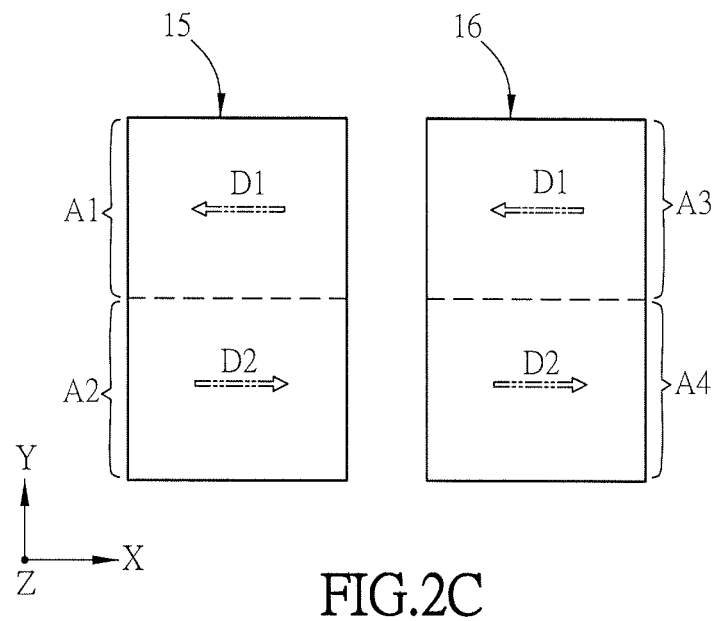
FIGS. 2C and 2D are schematic diagrams respectively showing that the alignment directions of the first alignment layer and the second alignment layer of FIG. 2A are the same and different.
Figure 2D:
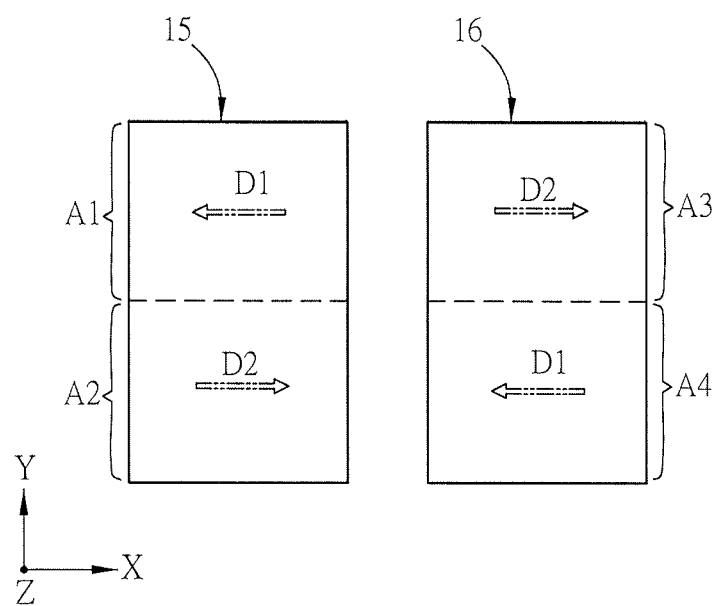

Refer to FIGS. 2C and 2D, which are schematic diagrams respectively showing that the alignment directions of the first alignment layer 15 and the second alignment layer 16 of FIG. 2A are the same and different. The arrowhead directions of FIGS. 2C and 2D correspond to the alignment directions of the first alignment layer 15 and the second alignment layer 16 of the pixel P in FIG. 2B.

As shown in FIG. 2C, the first alignment layer 15 includes the first alignment area A1 whose alignment direction is the direction D1 and the second alignment area A2 whose alignment direction is the direction D2, and the second alignment layer 16 includes the third alignment area A3 which corresponds to the first alignment area A1 and has the same alignment direction with the direction D1 and the fourth alignment area A4 which corresponds to the second alignment area A2 and has the same alignment direction with the direction D2. Or, as shown in FIG. 2D, the second alignment layer 16 includes the third alignment area A3 which corresponds to the first alignment area A1 and has the same alignment direction with the direction D2 and the fourth alignment area A4 which corresponds to the second alignment area A2 and has the same alignment direction with the direction D1. Favorably, the area of the first alignment area A1 is substantially the same as the alignment direction of the third alignment area A3, and the area of the second alignment area A2 is substantially the same as the alignment direction of the fourth alignment area A4.

As shown in FIG. 2B, the pixel P at least includes a first trunk electrode 141 disposed in the first alignment area A1 and at least two first branch electrodes 142 (the first electrode 14) respectively connected to two sides of the first trunk electrode 141. Herein, there are a plurality of first branch electrodes 142. Moreover, the extending direction of the first trunk electrode 141 is substantially the same as the alignment direction D1 of the first alignment area A1, i.e. the direction from right to left.

Furthermore, the pixel P includes a second trunk electrode 143 disposed in the second alignment area A2 and at least two second branch electrodes 144 (the second electrode 17) respectively connected to two sides of the second trunk electrode 143. Herein, there are a plurality of second branch electrodes 144. Moreover, the extending direction of the second trunk electrode 143 is substantially the same as the alignment direction D2 of the second alignment area A2, i.e.

the direction from left to right. Besides, the first electrode 14 is connected to the second electrode 17, and that is, at least one of the first branch electrodes 142 is connected to one of the second branch electrodes 144. Therefore, when the data signal is transmitted to the first electrode 14, the first electrode 14 disposed in the first alignment area A1 and the second electrode 17 disposed in the second alignment area A2 can have the same voltage.

In this embodiment, the first trunk electrode 141 and the second trunk electrode 143 are disposed parallelly, and the extension of one of the first branch electrodes 142 is parallel to one of the adjacent second branch electrodes 144. Herein, the first branch electrodes 142 at the upper side of the first trunk electrode 141 are disposed parallelly and separately, and the first branch electrodes 142 at the lower side of the first trunk electrode 141 are also disposed parallelly and separately. Moreover, the second branch electrodes 144 at the upper side of the second trunk electrode 143 are disposed parallelly and separately, and the second branch electrodes 144 at the lower side of the second trunk electrode 143 are also disposed parallelly and separately. Besides, the extensions of the first branch electrodes 142 at the upper side of the first trunk electrode 141 are parallel to the second branch electrodes 144 at the lower side of the second trunk electrode 143, and the extensions of the first branch electrodes 142 at the lower side of the first trunk electrode 141 are substantially parallel to the second branch electrodes 144 at the upper side of the second trunk electrode 143.

Figure 2E:
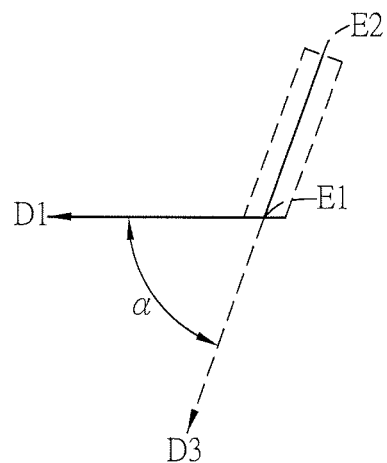
FIG. 2E is a schematic diagram showing that the extending direction of the first branch electrode of FIG. 2B and the alignment direction of the first alignment area.

Refer to FIG. 2B and FIG. 2E, wherein FIG. 2E is a schematic diagram showing that the extending direction of the first branch electrode 142 of FIG. 2B and the alignment direction D1 of the first alignment area A1.

As shown in FIG. 2B and 2E, at least one of the first branch electrodes 142 includes a first connection end E1 connected to the first trunk electrode 141 and a first distal end E2, and an included angle α between the extending direction D3 from the first distal end E2 to the first connection end E1 and the alignment direction D1 of the first alignment area A1 is between 50° and 80° (50°≤α≤80°). Favorably, the angle α between the extending direction D3 from the first distal end E2 to the first connection end E1 and the alignment direction D1 of the first alignment area A1 is between 60° and 80° (60°≤α≤80°). Likewise, at least one of the second branch electrodes 144 includes a second connection end E3 connected to the second trunk electrode 143 and a second distal end E4, and an included angle between the extending direction from the second distal end E4 to the second connection end E3 and the alignment direction D2 of the second alignment area A2 is between 50° and 80° (not shown) or favorably between 60° and 80°. In other words, in this embodiment, an acute angle (the same as the angle α) which exists between the extension direction of branch electrode (including the first branch electrode 142 and the second branch electrode 144) and the trunk electrode (including the first trunk electrode 141 and the second trunk electrode 143) connected with the branch electrode is between 50° and 80°.

Figure 2F:
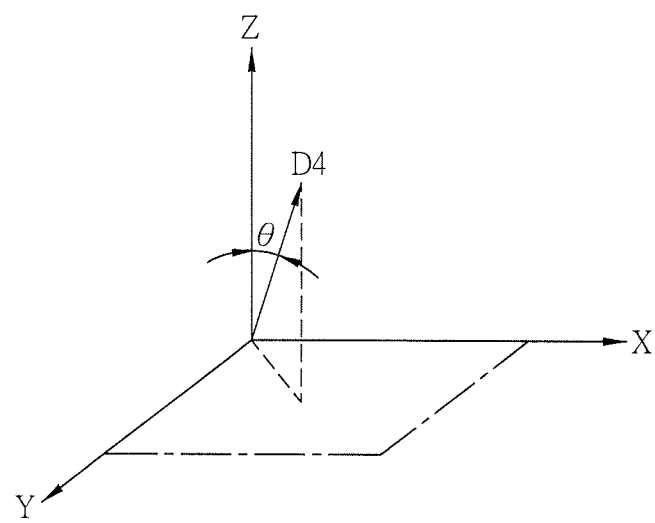
FIG. 2F, which is a schematic diagram showing the pre-tilt angle of the LC molecules of an embodiment of the disclosure.

Refer to FIG. 2F, which is a schematic diagram showing the pre-tilt angle of the LC molecules of an embodiment of the disclosure. The angle θ between the long-axis direction D4 of the LC molecule for the corresponding pixel P and the normal vector (i.e. the third direction Z) of the first substrate 11 is between 0.5° and 2° (0.5°≤θ≤2°). In other words, the pre-tilt angle of the LC molecule is limited to between 88° and 89.5° without data voltage. Besides, in the dark state (the LC molecules are not provided with voltage), the projection of the long-axis direction D4 (the direction of the pre-tilt angle or the direction of the LC director) of the LC molecule onto the X-Y plane (the first substrate 11) is substantially parallel to the extending direction of the first trunk electrode 141 (or the second trunk electrode 143). In the bright state (the LC molecules are provided with voltage), the X-axis component of the projection of the long-axis direction D4 (the direction of the pre-tilt angle or the direction of the LC director) of the LC molecule onto the X-Y plane (the first substrate 11) is substantially parallel to the extending direction of the first trunk electrode 141 (or the second trunk electrode 143).

Figure 2G:
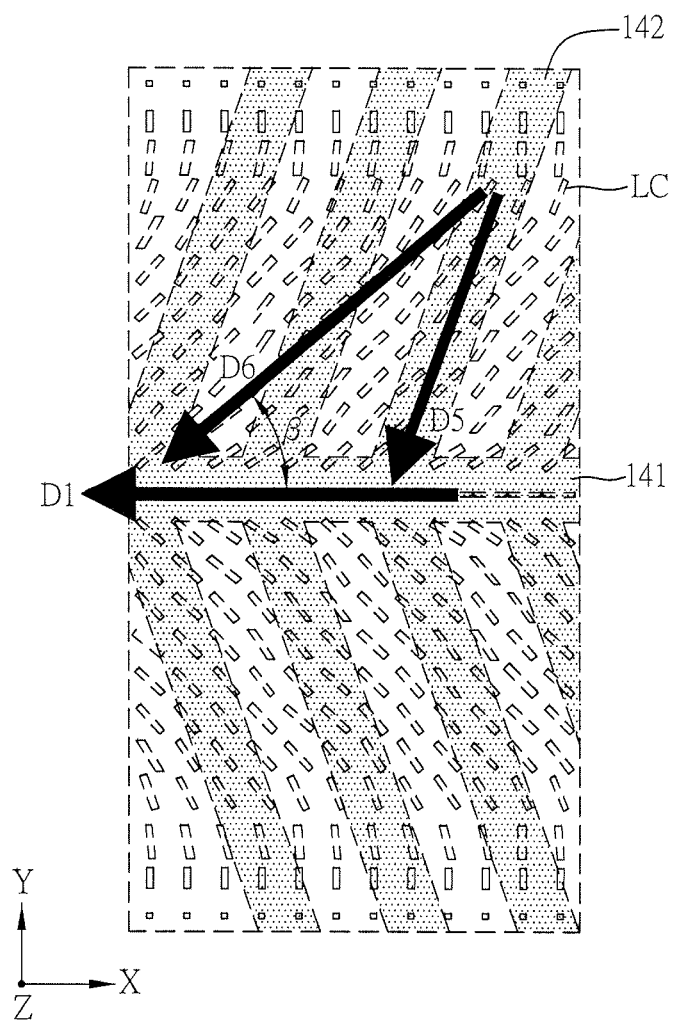
FIG. 2G is a schematic diagram of a part of the first electrodes of the first alignment area of FIG. 2B and the corresponding LC molecules.

Referring to FIG. 2G, it is a schematic diagram of a part of the first electrodes 14 of the first alignment area A1 of FIG. 2B and the corresponding LC molecules LC.

When the pixel P is in the bright state, the angle between the angle Ψ of the final position of the LC molecule and the absorption axis of the polarizer is 45°/135°/225°/315° and the angle θ is 90°, the LC molecules contributes to maximum transmittance (Ψ angle is the angle between the projection of the LC long-axis direction onto the X-Y plane and the first direction X, and the angle θ is the angle between the long-axis direction of the LC molecule and the normal vector (i.e. the third direction Z) of the X-Y plane). As shown in FIG. 2G, in this embodiment, the corresponding data voltages is transmitted to the pixels P through the data lines, and the resultant force (the direction D6) is accordingly generated from the electric-field (direction D5), which is formed between the pixel electrode (the first electrode 14) and the common electrode, and the projection (i.e. the direction D1) of the pre-tilt direction of the LC molecule onto the X-Y plane. Thus, the long-axis direction of the LC molecule in the bright state is oriented to the position which forms the angle β of 45°/135°/225°/315° with the absorption axis of the polarizer, and the LC molecules can contribute to the maximum transmittance thereby.

Regarding the conventional driving of the VA LCD panel with four-domain alignment, when the LC molecules are driven by the electric field, the angle θ thereof will be varied towards 90° depending on the different gray levels, but the angle Ψ driven at different gray levels will be directly oriented to 45°/135°/225°/315° instead of varying according to the different gray levels. In this disclosure, by the above design of the pixel electrode and the alignment direction, the angle Ψ of the LC molecules will be gradually varied to 45°/135°/225°/315° with the different gray levels, so that the display panel 1 has the optical characteristic or performance as possibly fine as IPS or FFS. In other words, as to the LC molecules LC for to the corresponding pixel P of this embodiment, the angle θ and the angle Ψ vary at the same time, so that the gamma curve with respect to the side view at the horizontal viewing angle is improved (i.e. the gamma curve with respect to the side view is shifted towards the gamma curve with respect to the front view). Therefore, compared to the conventional VA LCD panel, the washout problem can be improved, and the side view characteristics of the display panel 1 becomes as possibly fine as the FFS or IPS display panel for better display quality.

Figure 3A:
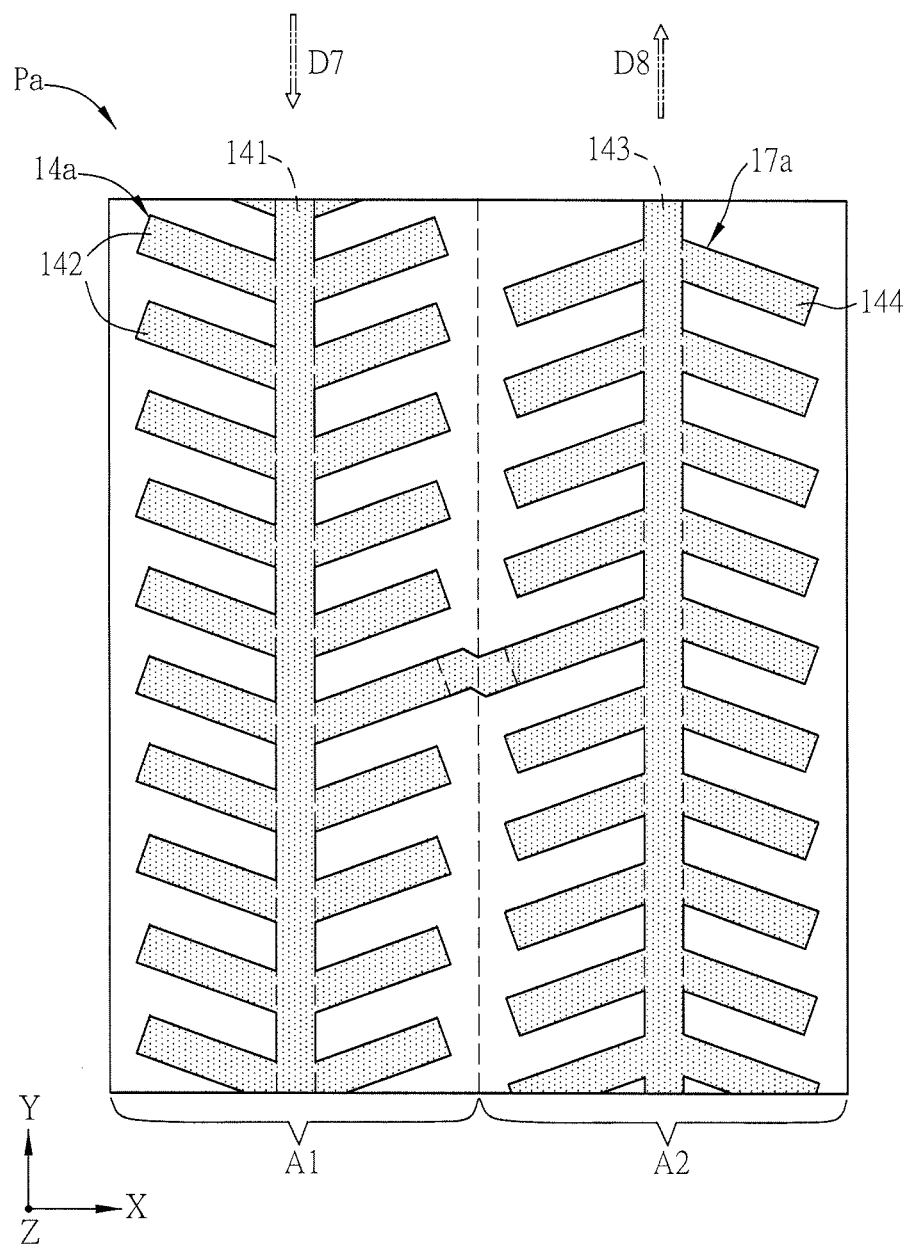
FIGS. 3A to 3C are schematic diagrams of the electrodes of the pixels and the alignment directions of the electrodes of different embodiments of the disclosure.
Figure 3B:
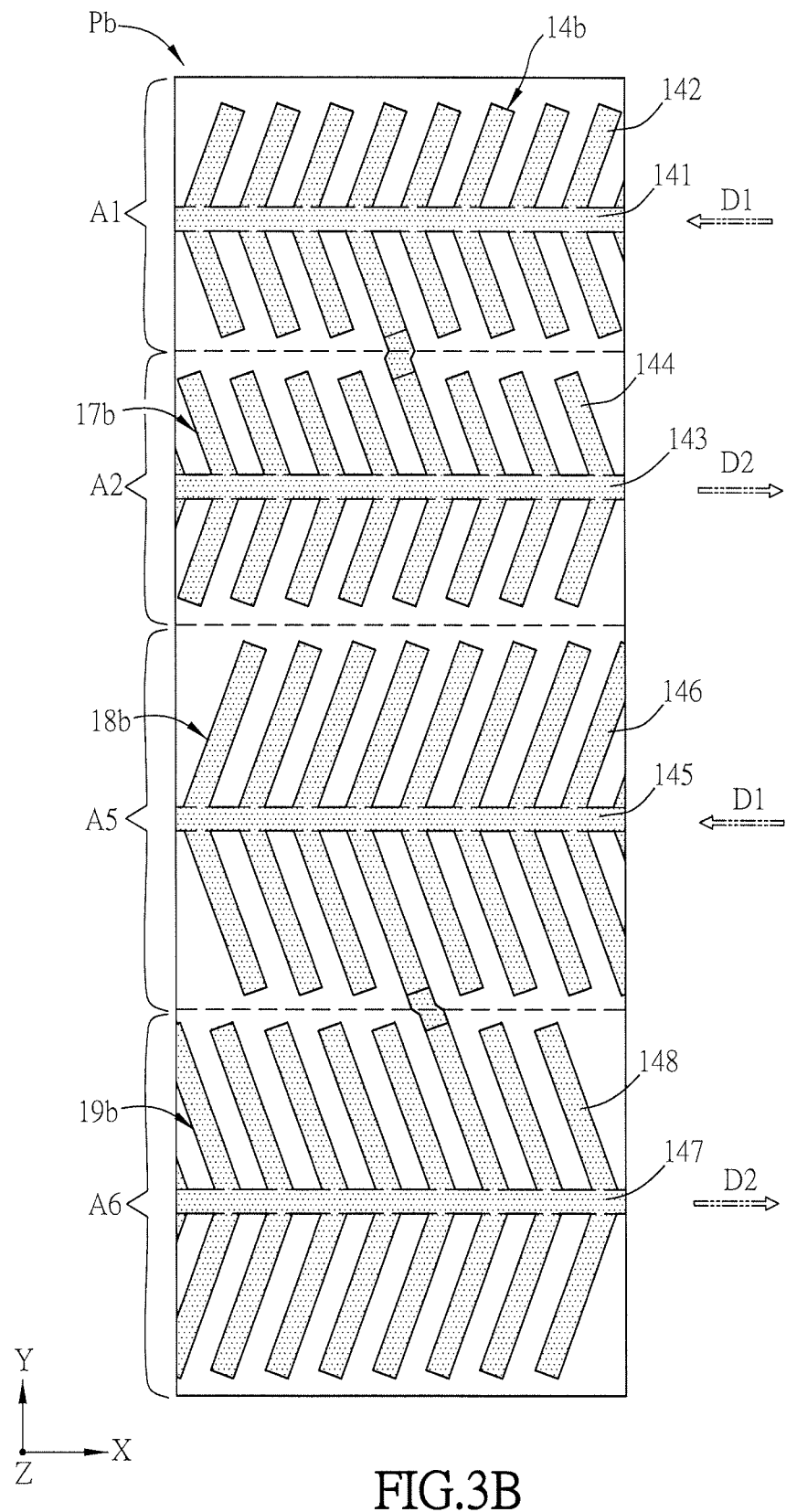
Figure 3C:
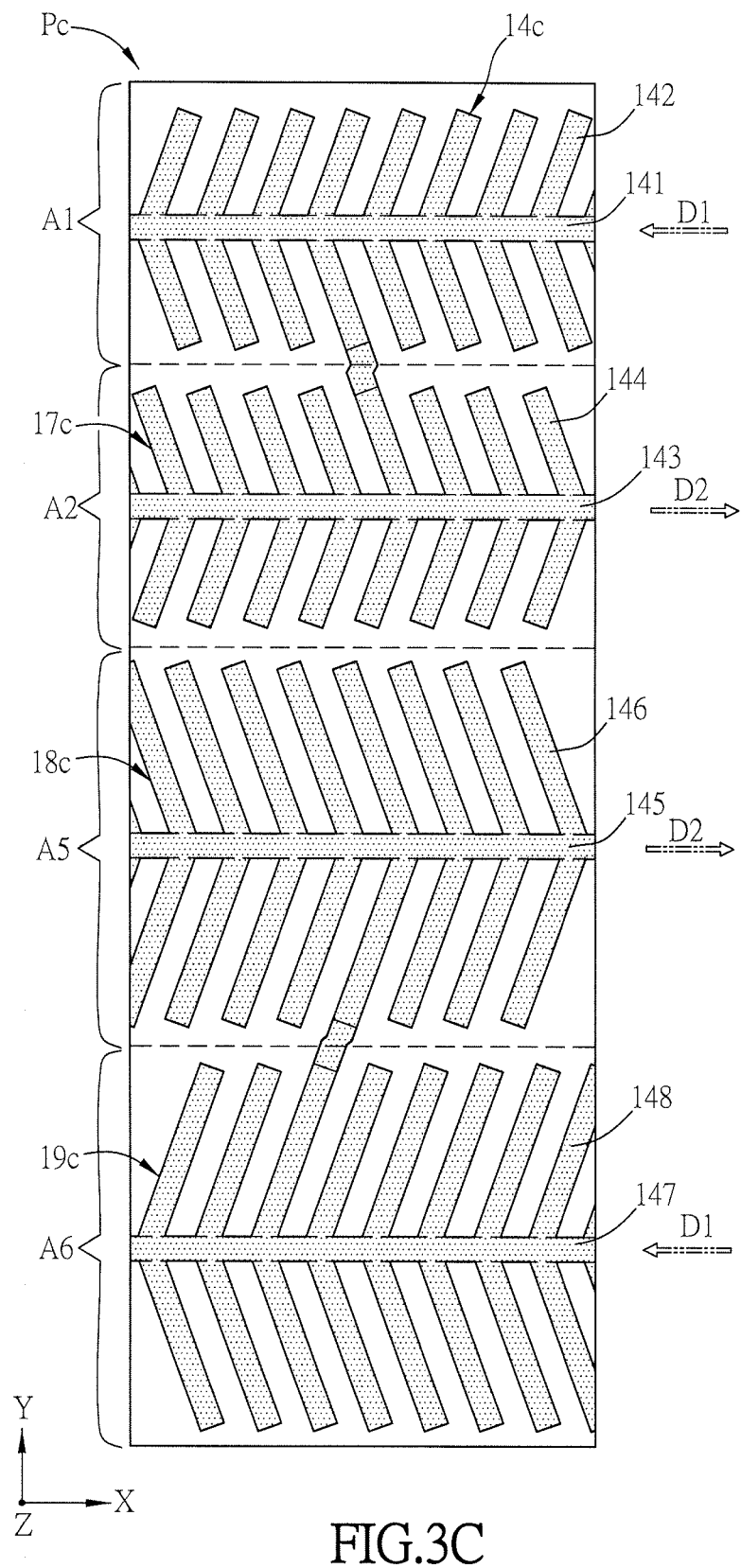

Refer to FIGS. 3A to 3C, which are schematic diagrams of the electrodes of the pixels Pa, Pb, Pc and the alignment directions of the electrodes of different embodiments of the disclosure.

As shown in FIG. 3A, the main difference between the first electrode 14a and the first electrode 14 of FIG. 2B is that the extending direction of the first trunk electrode 141 of the first electrode 14a and the extending direction of the second trunk electrode 143 of the second electrode 17a in FIG. 3A are substantially parallel to the second direction Y (which is substantially parallel to the extending direction of the data line), and are substantially parallel to the alignment direction D7 of the first alignment area A1 and the alignment direction D8 of the second alignment area A2 respectively. Moreover, the alignment direction D7 of the first alignment area A1 and the alignment direction D8 of the second alignment area A2 in this embodiment are parallel to the second direction Y and opposite to each other. Herein, the direction D7 is a downward direction and the direction D8 is an upward direction.

As shown in FIG. 3B, the main difference from FIG. 2B is that the first alignment layer 15 of this embodiment includes not only the first alignment area A1 and the second alignment area A2 but also a fifth alignment area A5 and a sixth alignment area A6. Besides, the alignment direction D1 of the fifth alignment area A5 and the alignment direction D2 of the sixth alignment area A6 are opposite to each other. Moreover, the alignment direction of the fifth alignment area A5 is the same as the alignment direction of the first alignment area A1, i.e. the direction D1, and the alignment direction of the sixth alignment area A6 is the same as the alignment direction of the second alignment area A2, i.e. the direction D2.

The pixel Pb further includes a third trunk electrode 145 disposed in the fifth alignment area AS and at least two third branch electrodes 146 (called the third electrode 18b) respectively connected to two sides of the third trunk electrode 145 (each of the two sides of the third trunk electrode 145 has a plurality of third branch electrodes 146). The pixel Pb further includes a fourth trunk electrode 147 disposed in the sixth alignment area A6 and at least two fourth branch electrodes 148 (called the fourth electrode 19b) respectively connected to two sides of the fourth trunk electrode 147 (each of the two sides of the fourth trunk electrode 147 has a plurality of fourth branch electrodes 148). Moreover, the extending direction of the third trunk electrode 145 is substantially the same as the alignment direction D1 of the fifth alignment area A5, and the extending direction of the fourth trunk electrode 147 is substantially the same as the alignment direction D2 of the sixth alignment area A6. Besides, the third electrode 18b is connected to the fourth electrode 19b, and that is, at least one of the third branch electrodes 146 is connected to one of the fourth branch electrodes 148. In addition, an included angle between the extending direction from a third distal end (not marked) to a third connection end (not marked) of the third branch electrode 146 and the alignment direction D1 of the fifth alignment area A5 (or the first alignment area A1) is between 50° and 80°, wherein the third connection end is connected to the third trunk electrode 145. And an included angle between the extending direction from a fourth distal end (not marked) to a fourth connection end (not marked) of the fourth branch electrode 148 and the alignment direction D2 of the sixth alignment area A6 is between 50° and 80°, wherein the fourth connection end is connected to the fourth trunk electrode 147. Therefore, in this embodiment, each of the first alignment area A1, the second alignment area A2, the fifth alignment area A5 and the sixth alignment area A6 includes two domains, so that a pixel Pb can have the 8-domain alignment.

In FIG. 3B, the first electrode 14b and the second electrode 17b form a first area, and the third electrode 18b and the fourth electrode 19b form a second area. The first area and the second area can be provided with the image data through different data lines, so that a voltage difference exists between the first area and the second area (i.e. a voltage level difference exists between the second electrode 17b and the third electrode 18b) during the same frame time. Because each of the pixels Pb is divided into two areas, the compensation which results from different voltage-transmittance curves for the two areas at the front view and side view helps the low color shift (LCS). By utilizing such design, the experiment demonstrates that the pixel Pb can have a higher transmittance than the pixel P by 5%~15% in the display panels.

As shown in FIG. 3C, the main difference between the pixel Pc and the pixel Pb of FIG. 3B is that the alignment direction of the fifth alignment area A5 of the pixel Pc is the direction D2, which is opposite to the alignment direction D1 of the first alignment area A1 but the same as the alignment direction of the second alignment area A2. Besides, the alignment direction of the sixth alignment area A6 of the pixel Pc is the direction D1, which is opposite to the alignment direction D2 of the second alignment area A2 but the same as the alignment direction D1 of the first alignment area A1. Hence, the second electrode 17c and the third electrode 18c have the same alignment direction, so that the dark line area between the second electrode 17c and the third electrode 18c can be reduced and the transmittance can be raised. Moreover, other technical features of the electrodes of the pixels Pa, Pb, Pc (including the first electrodes 14a, 14b, 14c, the second electrodes 17a, 17b, 17c, the third electrodes 18b, 18c and the fourth electrodes 19b, 19c) and the alignment directions thereof can be comprehended by referring to the description of the above-mentioned first electrode 14 of the pixel P and the alignment direction thereof, so the related illustrations are omitted here for conciseness.

Figure 4:
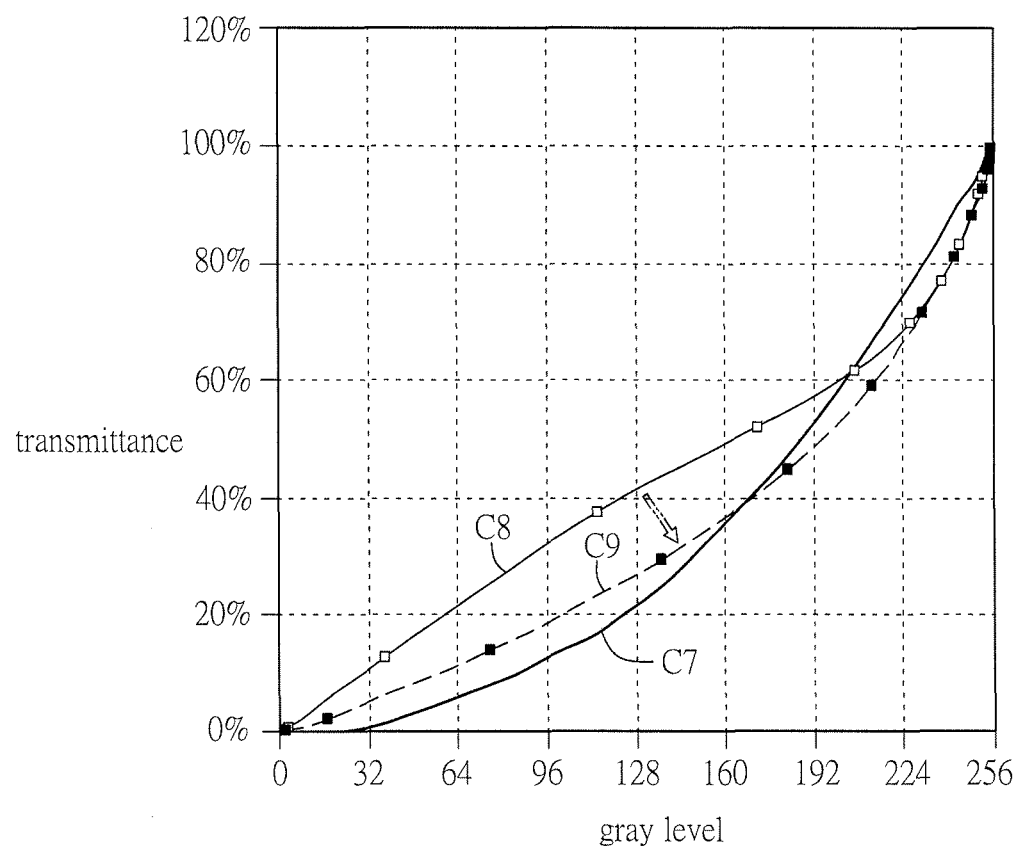
FIG. 4 is a schematic diagram showing the gamma curves corresponding to different gray levels displayed by the pixel of an embodiment of the disclosure.

Refer to FIG. 4, which is a schematic diagram showing the gamma curves corresponding to different gray levels displayed by the pixel of an embodiment of the disclosure. The curves C7, C8 are respectively the gamma curves with respect to the front view and the side view, and the curve C9 is the gamma curve with respect to the side view under the application of the design of the above-mentioned pixel electrode and the alignment direction thereof.

From FIG. 4, it can be found in this disclosure that the gamma curve with respect to the side view at the horizontal viewing angle can be shifted towards the gamma curve with respect to the front view (moving towards the direction of the curve C7 so that the curve C9 with respect to the side view is closer to the curve C7 with respect to the front view). Therefore, compared to the conventional art, the washout problem at the side view can be improved, so that the side view characteristics of the display panel becomes as possibly fine as the FFS or IPS display panel for better display quality.

Summarily, in the display panel of the disclosure, the alignment direction of the first alignment area of the first alignment layer is opposite to the alignment direction of the second alignment area. The first electrode is disposed in the first alignment area and includes a first trunk electrode and at least two first branch electrodes respectively connected to two sides of the first trunk electrode. At least one of the first branch electrodes includes a first distal end and a first connection end connected to the first trunk electrode, and an included angle between the extending direction from the first distal end to the first connection end and the alignment direction of the first alignment area is between 50° and 80°. By the design of the pixel electrode and the alignment direction of the disclosure, the washout problem at the side view occurring in the conventional display panel can be improved, and the side view characteristics of the display panel becomes better even as possibly fine as the FFS or IPS display panel for better display quality.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel, comprising:
   a first substrate;
   a second substrate;
   a display medium layer disposed between the first substrate and the second substrate;
   a first electrode disposed on the first substrate; and
   a first alignment layer disposed on the first electrode and comprising a first alignment area and a second alignment area, wherein an alignment direction of the first alignment area is opposite to an alignment direction of the second alignment area, the first electrode is disposed in the first alignment area and comprises a first trunk electrode and at least two first branch electrodes respectively connected to two sides of the first trunk electrode, at least one of the first branch electrodes comprises a first distal end and a first connection end connected to the first trunk electrode, and an included angle between the extending direction from the first distal end to the first connection end and the alignment direction of the first alignment area is between 50° and 80°.

2. The display panel as recited in claim 1, further comprising:
   a second electrode disposed in the second alignment area and comprises a second trunk electrode and at least two second branch electrodes respectively connected to two sides of the second trunk electrode, wherein at least one of the second branch electrodes comprises a second distal end and a second connection end connected to the second trunk electrode, an included angle between the extending direction from the second distal end to the second connection end and the alignment direction of the second alignment area is between 50° and 80°, and the first electrode is electrically connected with the second electrode.

3. The display panel as recited in claim 2, wherein the first trunk electrode and the second trunk electrode are disposed substantially parallelly, and one of the first branch electrodes is substantially parallel to one of the adjacent second branch electrodes.

4. The display panel as recited in claim 2, further comprising:
   a third electrode disposed on the first substrate, wherein the first alignment layer covers the third electrode, the second electrode is disposed between the first electrode and the third electrode, the third electrode at least comprises a third trunk electrode and at least two third branch electrodes respectively connected to two sides of the third trunk electrode, at least one of the third branch electrodes comprises a third distal end and a third connection end connected with the third trunk electrode, an included angle between the extending direction from the third distal end to the third connection end and the alignment direction of the second alignment area is 50° and 80°, and a voltage difference exists between the second electrode and the third electrode during a frame time.

5. The display panel as recited in claim 2, further comprising:
   a third electrode disposed on the first substrate, wherein the first alignment layer covers the third electrode, the second electrode is disposed between the first electrode and the third electrode, the third electrode at least comprises a third trunk electrode and at least two third branch electrodes respectively connected to two sides of the third trunk electrode, at least one of the third branch electrodes is parallel to the adjacent second branch electrode, and a voltage difference exists between the second electrode and the third electrode during a frame time.

6. The display panel as recited in claim 1, further comprising:
   a second alignment layer disposed on the second substrate and comprising a third alignment area corresponding to the first alignment area and a fourth alignment area corresponding to the second alignment area.

7. The display panel as recited in claim 6, wherein an alignment direction of the third alignment area is opposite to an alignment direction of the fourth alignment area.

8. The display panel as recited in claim 7, wherein the alignment direction of the third alignment area is the same as or opposite to the alignment direction of the first alignment area.

9. The display panel as recited in claim 1, wherein the display medium layer comprises a plurality of liquid crystal molecules, and an included angle between a long-axis direction of the liquid crystal molecules and a normal vector of the first substrate is between 0.5° and 2°.

10. The display panel as recited in claim 1, wherein the alignment direction of the first alignment area is substantially parallel to the extending direction of a scan line or a data line of the display panel.

* * * * *